3,211,672
MERCURIC CHLORIDE CATALYST
Jack R. Lytle, Cleveland, Ohio, assignor to The Harshaw Chemical Company, Cleveland, Ohio, a corporation of Ohio
Filed Oct. 30, 1961, Ser. No. 150,853
4 Claims. (Cl. 252—441)

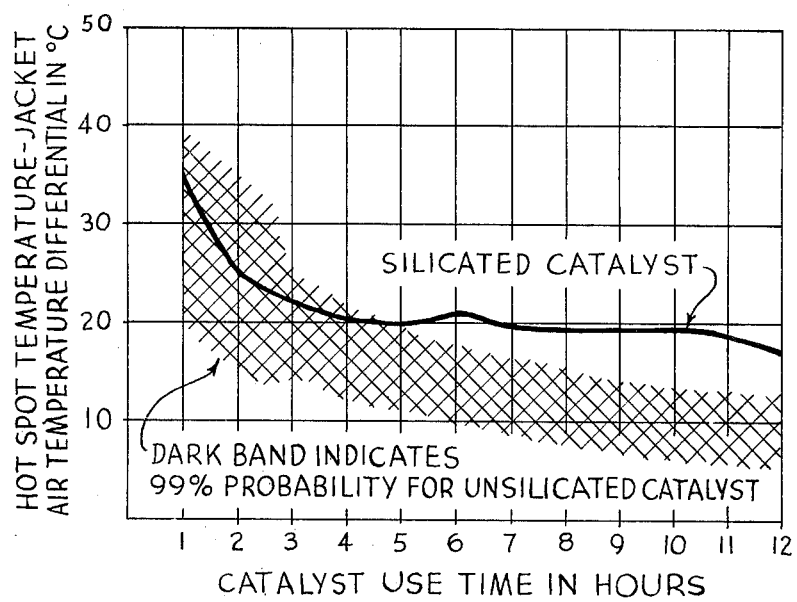

This application, which is a continuation-in-part of my copending application, Serial No. 848,157, filed October 22, 1959, now abandoned, relates to the preparation of vinyl halides by the catalytic vapor phase reaction of a hydrogen halide with acetylene.

Mercuric chloride is known to exert a catalytic effect on the vapor phase reaction of a hydrogen halide with acetylene, the catalytic effect apparently being due to the formation of mercuric chloride complexes with the reaction components. Mercuric chloride catalysts are commonly composed of mercuric chloride adhered to a support such as, for instance, carbon or pumice. The mercuric chloride component, however, is susceptible to rapid sublimation when subjected to vapor phase reaction temperatures. The sublimation tendency of mercuric chloride results in the catalyst having a relatively short life and correspondingly decreased commercial value.

Attempts have been made to counteract the sublimation tendency of mercuric chloride catalysts by employing complex salts of mercuric chloride and chlorides of alkali or alkaline earth metals. The complex salt catalysts, however, have been found unsatisfactory in that they only minimize the sublimation tendencies of mercuric chloride at those temperatures which are below the minimum temperature requirements for high yields of vinyl chloride.

Attempts have also been made to improve mercuric chloride catalyst by fixing mercuric chloride within finely powdered silica and then adhering the treated silica to a support. Catalysts of this type have not been found to have satisfactory activity or abrasion resistance.

It is, therefore, an object of this invention to provide a mercuric chloride catalyst with increased sublimation resistance.

It is another object of this invention to provide a mercuric chloride catalyst with increased sublimation resistance having undiminished activity and undiminished abrasion resistance.

It is another object of this invention to provide a mercuric chloride catalyst with increased sublimation resistance at high vinyl chloride yield temperatures.

It is a further object of this invention to prepare vinyl halides by the vapor phase reaction of hydrogen halide with acetylene in the presence of a preformed sublimation resistant mercuric chloride catalyst.

Mercuric chloride catalysts are commonly prepared by impregnating a porous carrier with a solution of mercuric chloride and then drying. I have now found that if a mercuric chloride catalyst prepared in this manner is subsequently treated with a solution of colloidal silica, that the sublimation resistance of the catalyst will be greatly enhanced without affecting the activity or abrasion resistance of the catalyst.

Various inert porous carriers are suitable for the purposes of this invention. Specific porous carriers which are suitable are charcoal, pumice, and alumina. Colloidal silicas which may be employed are those forms of colloidal silica which are dispersed in aqueous medium, such as, for instance, Ludox LS and Ludox HS. These products, which are marketed by E. I. du Pont de Nemours and Company, are very low in alkali content and have a $SiO_2$ content of from 20% to 35%. The higher concentrations of silica are more desirable in that they decrease the amount of water which must be removed from the final product. The concentration of water, however, has no noticeable effect on the efficiency with which the colloidal silica adheres to the impregnated porous carrier.

The novel mercuric chloride catalyst of this invention is prepared by impregnating a porous carrier selected from the class consisting of charcoal, pumice and alumina with from .03 to 0.2 pound of mercuric chloride per pound of carrier, drying the impregnated carrier and then coating the impregnated carrier with colloidal silica and again drying so as to deposit from .01 to .08 pound of silica per pound of impregnated carrier on the surface of said impregnated carrier. All weight measurements are made on the basis of oven dry weights.

Specific preparations of the silicated mercuric chloride catalyst of this invention may be carried out as follows:

EXAMPLE I 116 pounds of mercuric chloride are dissolved in 680 pounds of demineralized water. The water is then heated to insure the complete solution of the mercuric chloride. A rubber lined Abbe blender is charged with 900 pounds of activated carbon (4 to 6 mesh). The mercuric chloride solution is then added to the activated carbon by gravity drop and uniform impregnation is insured by rotating the blender. The impregnated material is then loaded into enamelled drier trays and dried at 275° F. in Rockwell gas fired driers. 1,000 pounds of the mercuric chloride impregnated activated carbon is then blended with a solution of 103 pounds of colloidal silica (30% $SiO_2$) and 350 pounds of tap water. Sufficient blending operations are carried out so that the carbon particles are uniformly wetted. The blended material is then loaded into enamelled drier trays and dried at 275° F. in Rockwell gas fired driers. The finished product contains approximately 2.9% silica.

EXAMPLE II 116 pounds of mercuric chloride are dissolved in 680 pounds of demineralized water. The water is then heated to insure the complete solution of the mercuric chloride. A rubber lined Abbe blender is charged with 900 pounds of activated alumina (4 to 10 mesh). The mercuric chloride solution is then added to the activated alumina by gravity drop and uniform impregnation is insured by rotating the blender. The impregnated material is then loaded into enamelled drier trays and dried at 275° F. in Rockwell gas fired driers. 1,000 pounds of the mercuric chloride impregnated alumina is then treated with colloidal silica in the same manner described in Example I.

Vinyl halides and more specifically vinyl chloride may be prepared by a process employing the novel mercuric chloride of this invention. The process is carried out as follows: Acetylene is purified by passing it through a tower and scrubbing it with an 85% aqueous $H_2SO_4$ solution, which is circulated counter-current through the tower from a reservoir. The acetylene is then sent to a carbon packed tower and from there to an $Al_2O_3$ drying tower. The scrubbed acetylene and suitable amounts of anhydrous hydrogen chloride are then fed into a T-mixer, where they are mixed and passed into a preheater and thence into a reactor. The acetylene and hydrogen chloride reaction mixture is then reacted in the presence of a silicated mercuric chloride catalyst contained in an elongated cylindrical reactor at about 90° C. to 250° C. The preferred reaction temperature is 110° C. The reactant mixture is suitably passed over the catalyst at a space velocity between 100 and 400 hours. (Space velocity is the number of volumes of hot gas passing through unit volume of reaction space in unit time.) The reaction takes place in that part of the catalyst bed which is known as the "hot spot." The term "hot spot" as used in this invention may be defined as that area, within the catalyst bed of a reactor, which has the highest temperature. As the catalyst becomes spent, the hot spot moves downward through the catalyst bed. The hot spot can be located by temperature readings on thermocouples which are located at various depths in the catalyst bed. When the thermocouple readings indicate that the hot spot has moved to the bottom of the reactor, the catalyst is considered to be exhausted and the reactor containing the exhausted catalyst is taken out of the line and a fresh reactor is placed in the system. The effluent gases contain vinyl halide along with unreacted acetylene and mercuric chloride. The vinyl halide is separated from the unreacted gases and scrubbed in a sodium hydroxide solution. The unreacted mercuric chloride and acetylene may then be recycled to the reactor.

It has been found that the life of the silicated mercuric chloride catalyst of this invention may be extended by saturating the feed gases with mercuric chloride vapor. The saturation is carried out by passing the feed gases over mercuric chloride pellets at about 100° C. Temperatures much in excess of 100° C., however, will result in such heavy volatilization of mercuric chloride as to foul the entire system with mercuric chloride crystals.

To evaluate the degree of improvement of the silicated mercuric chloride catalyst of this invention, identical runs were made employing both the silicated mercuric chloride catalyst and a catalyst which was identical in all respects with the exception that it had not been treated with colloidal silica. Results of this evaluation are more fully illustrated by the drawing. The drawing is a graph wherein the X coordinate is catalyst use time given in hours and the y coordinate is the differential of the hot spot temperature compared to the reactor jacket air temperature. The temperature differential is a satisfactory test of catalyst life. Mercuric chloride catalysts are generally considered to be acceptable for the synthesis of vinyl chloride until the temperature of the hot spot and the reactor jacket air temperature are within 10° C. of each other. A shaded band on the graph represents the area in which the true value for the unsilicated catalyst activity curve will fall with 99% probability, that is, only one time in a hundred would a catalyst curve accidentally fall outside this band. The solid line plots the evaluation of the silicated mercuric chloride catalyst. The drawing, therefore, clearly illustrates the superiority of the silicated mercuric chloride catalyst over the unsilicated catalyst. The increased life of the silicated catalyst is presumably due to the fact that the coloidal silica affects some type of surface phenomena which binds the mercuric chloride to the porous carrier and thus prevents its sublimation. It has been found, for instance, that treatment with colloidal silica changes the surface area of the catalyst from about 745 square meters per gram prior to silication to about 833 square meters per gram after silication.

To evaluate the degree of improvement of the silicated catalyst of this invention over certain catalysts of the prior art which fixed mercuric chloride within silica and then adhered the treated silica to a support, a series of samples were prepared and subjected to abrasion and activity tests.

EXAMPLE A 1 liter of water was mixed with 50 g. of mercuric chloride, 125 cc. of silicon tetrachloride was then added to the aqueous solution of mercuric chloride. An additional one liter of water was added to the mixture to aid in the addition of silicon tetrachloride. Additional quantities of silicon tetrachloride were then added to bring the total quantity of silicon tetrachloride added up to 850 cc., sufficient water being added to aid in the addition operations. The mixture was then placed in a crystallizing dish and dried at 100° C. to 105° C. The dried material was then screened through an 80 mesh screen. 200 grams of pumice moistened with 100 ml. of water was then agitated in a tumbler. 13 g. of the previously prepared and screened siliceous material was then added to the pumice and tumbled for 10 minutes. The tumbled material was then dried for about ten hours at 100° C. The material was found to contain 9.2% mercuric chloride.

EXAMPLE B 50 g. of mercuric chloride was added to 1 ml. of water. 430 g. of carbon was then added to the mercuric chloride solution in small portions. 37.8 cc. of silicon tetrachloride was then added to the mixture. The mixture was then placed in a crystallizing dish and dried at a temperature of from about 104° C. to 106° C. The dried material was then passed through an 80 mesh screen. 200 g. of pumice and 100 ml. of distilled water were then agitated in a tumbler. 15 g. of the previously prepared screened siliceous material was then added to the tumbler and the admixture was agitated for about 10 minutes. The resultant material was then dried for about 10 hours at 100° C. The material was found to contain 9.8% mercuric chloride.

EXAMPLE C 1 liter of water was added to 50 g. of mercuric chloride crystals. 350 g. of carbon was added in small portions to the mercuric chloride solution. 189 cc. of silicon tetrachloride was then added. The mixture was transferred to a drying dish and dried at a temperature of from about 100° C. to 105° C. The dried material was then passed through an 80 mesh screen. 200 g. of pumice were then placed in a tumbler with 100 ml. of water and agitated. 11 g. of the previously prepared and screened siliceous material was then added in a tumbler and the material agitated for ten minutes. The tumbled material was then dried for about ten hours at about 100° C. The material was found to contain 10% mercuric chloride.

Attrition tests were then carried out in order to evaluate the silicated mercuric chloride catalyst of this invention as compared with silicated catalysts of the prior art. The attrition test is conducted by placing a weighed amount of the sample in a horizontally mounted cylinder. The cylinder is rotated at a constant speed for a twenty minute period. The rotated material is then taken from the cylinder and screened through a 20 mesh screen. The material passing through the screen is weighed and reported as percent weight loss. The following table, designated as Table I, is a comparison of attrition tests made on the Prior Art catalysts (Examples A, B, and C) and the silicated mercuric chloride catalysts of this invention.

*Table I*

| Example | Active Phase | Analysis of Catalyst, percent HgCl₂ | | Weight Loss Due to Attrition Test, percent |
|---|---|---|---|---|
| | | Before Attrition | After Attrition | |
| Example A (adhered HgCl₂). | HgCl₂=9.2%<br>SiO₂=79% | 0.43 | 0.16 | 12.8 |
| Example B (adhered HgCl₂). | HgCl₂=9.8%<br>SiO₂=3.63% | 0.3 | 0.04 | 13.7 |
| Example C (adhered HgCl₂). | HgCl₂=10%<br>SiO₂=16.4% | 0.33 | 0.05 | 12.2 |
| Example I (impregnated HgCl₂). | HgCl₂=10%<br>SiO₂=2.9% | 17.0 | 16.9 | 5.7 |

A catalyst having an attrition loss of less than 6% to 7% is desirable. A catalyst having an attrition loss in excess of 7% is not considered to have sufficient resistance to handling and, therefore, not commercially usable. Table I clearly illustrates the ability of the silicated mercuric chloride catalyst of this invention (Example 1) to withstand attrition and the inability of prior art silicated mercuric chloride catalysts (Examples A, B, and C) to withstand attrition.

In order to evaluate the activity of certain silicated mercuric chloride catalysts of the prior art, a procedure was set up for the synthesis of vinyl chloride wherein the prior art catalyst designated as Example A and Example B were employed. The vinyl chloride synthesis was carried out by first drying acetylene and hydrogen chloride gases by passage through calcium chloride. The dried gases were then mixed and allowed to react in a U-tube containing 50 grams of the catalyst. The rate of flow of acetylene and hydrogen chloride was 0.5 moles per hour and 0.3 moles per hour respectively. The reactions were carried out over a wide temperature range, the temperature being determined by a reading taken of the reactor jacket air temperature by means of a thermocouple placed within the area. As the formation of vinyl chloride from acetylene and hydrogen chloride is an exothermic reaction, an increase in temperature over that temperature applied to the reactor jacket is indicative of the formation of vinyl chloride. An increase in temperature of 10° C. is the minimum temperature differential which can be considered as indicative of an operative catalyst. The following table, designated as Table II, sets forth vinyl chloride syntheses runs made with prior art Catalyst Examples A and B over applied temperature ranges of from 60° to 150°.

*Table II*

| Applied Temperature, ° C. | 60 | 90 | 120 | 150 |
|---|---|---|---|---|
| Temp. differential of Catalyst of Example A degrees | 2 | 2 | 2 | 2 |
| Temp. differential of Catalyst of Example B degrees | 3 | 3 | 3 | 3 |

As can be seen from Table II none of the prior art catalysts produced a temperature differential in excess of 3 degrees, the lack of temperature differential being indicative of poor performance of the catalyst. In contradistinction to the results shown by the prior art catalysts in Table II, the silicated mercuric chloride catalyst prepared by the method disclosed in this invention will maintain a temperature differential in excess of 10° C. for an extended period, as can be seen from the aforementioned discussion of the drawing.

Having thus disclosed my invention, what I claim is:

1. A catalyst for the formation of vinyl halide from acetylene and hydrogen halide, said catalyst comprising a porous carrier having a particle size in the range of from 4–10 mesh impregnated with from .03 to 0.2 pounds of mercuric chloride per pound of carrier and coated with from .01 to .08 pounds of colloidal silica per pound of impregnated carrier.

2. The catalyst of claim 1 wherein the porous carrier is a carrier selected from the group consisting of alumina, pumice, and carbon.

3. A method of making a mercuric chloride catalyst comprising the steps of impregnating a porous carrier with a solution of mercuric chloride, drying the resulting material and then coating it with aqueous, colloidal silica and again drying it.

4. A method of making a mercuric chloride catalyst comprising the steps of impregnating a porous carrier of the class consisting of alumina, charcoal and pumice with from 0.03 to 0.2 pounds of mercuric chloride per pound of carrier, drying the resulting material, then coating it with aqueous colloidal silica sufficient to deposit thereon from 0.01 to 0.08 pounds of silica per pound of impregnated carrier and then drying the so treated material whereby to produce a dried catalyst impregnated with mercuric chloride and coated with silica.

References Cited by the Examiner

FOREIGN PATENTS 573,561  11/45  Great Britain.
652,740  5/51  Great Britain.

OTHER REFERENCES

Barton et al.: J. Soc. Chem. Ind., vol. 69 pp. 75–79 (1950).

MAURICE A. BRINDISI, *Primary Examiner.*

ALPHONSO D. SULLIVAN, *Examiner.*